(12) United States Patent
Guo

(10) Patent No.: US 10,917,848 B2
(45) Date of Patent: Feb. 9, 2021

(54) WAKE-UP FRAME TRANSMISSION METHOD AND DEVICE

(71) Applicant: HUAWEI TECHNOLOGIES CO., LTD., Guangdong (CN)

(72) Inventor: Yuchen Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/382,154

(22) Filed: Apr. 11, 2019

(65) Prior Publication Data

US 2019/0246355 A1    Aug. 8, 2019

Related U.S. Application Data

(63) Continuation of application No. PCT/CN2017/105647, filed on Oct. 11, 2017.

(30) Foreign Application Priority Data

Oct. 14, 2016  (CN) .......................... 2016 1 0896172

(51) Int. Cl.
*H04W 52/02* (2009.01)
*H04L 12/12* (2006.01)
(Continued)

(52) U.S. Cl.
CPC ......... *H04W 52/0229* (2013.01); *H04L 12/12* (2013.01); *H04W 48/16* (2013.01);
(Continued)

(58) Field of Classification Search
CPC ............. H04W 52/0229; H04W 52/02; H04W 52/0235; H04W 48/16; H04W 72/0446;
(Continued)

(56) References Cited

U.S. PATENT DOCUMENTS 9,210,719 B2 *  12/2015  Habetha .................. H04W 4/06
2007/0183326 A1 *  8/2007  Igarashi .................. H04L 65/80
                                                                370/230
(Continued)

FOREIGN PATENT DOCUMENTS

CN         102300293 A      12/2011
CN         103327651 A       9/2013
(Continued)

*Primary Examiner* — Ivan O Latorre
(74) *Attorney, Agent, or Firm* — Hauptman Ham, LLP

(57) ABSTRACT

Embodiments of this application provide a wake-up frame transmission method and devices. The method includes: determining, by a first device, an enhanced distributed channel access (EDCA) parameter set of a wake-up frame, where the wake-up frame is used to wake up one or more second devices to receive a data frame; determining, by the first device based on the EDCA parameter set of the wake-up frame, whether a channel resource is in an idle state; and sending, by the first device, the wake-up frame to the second device when the channel resource is in the idle state. In the embodiments of this application, the first device can perform channel resource contention based on the EDCA parameter set corresponding to the wake-up frame, so that a service of a high priority can be obtained by transmitting a wake-up frame of a high priority, thereby improving QoS performance of the wake-up frame.

18 Claims, 10 Drawing Sheets

(51) Int. Cl.
*H04W 48/16* (2009.01)
*H04W 72/04* (2009.01)
*H04W 74/08* (2009.01)
*H04W 80/02* (2009.01)

(52) U.S. Cl.
CPC ....... *H04W 52/02* (2013.01); *H04W 52/0235* (2013.01); *H04W 72/0446* (2013.01); *H04W 74/0808* (2013.01); *H04W 80/02* (2013.01); *Y02D 30/70* (2020.08)

(58) Field of Classification Search
CPC ............. H04W 74/0808; H04W 80/02; H04W 52/0225; H04W 72/10; H04W 74/0833; H04L 12/12; Y02D 70/10; Y02D 70/14; Y02D 70/20; Y02D 70/00
See application file for complete search history.

(56) References Cited

U.S. PATENT DOCUMENTS

| | | | |
|---|---|---|---|
| 2012/0314694 A1* | 12/2012 | Hsieh | H04W 74/085 370/338 |
| 2013/0201974 A1* | 8/2013 | Merlin | H04W 68/00 370/336 |
| 2014/0064301 A1* | 3/2014 | Rison | H04W 74/085 370/448 |
| 2014/0169290 A1 | 6/2014 | Seok et al. | |
| 2014/0293868 A1* | 10/2014 | Levanen | H04L 1/1607 370/328 |
| 2015/0009879 A1 | 1/2015 | Kim et al. | |
| 2015/0103710 A1* | 4/2015 | Lv | H04W 52/0219 370/311 |
| 2015/0188826 A1* | 7/2015 | Thodupunoori | H04L 47/24 370/392 |
| 2015/0236822 A1* | 8/2015 | Pirskanen | H04W 72/044 370/329 |
| 2016/0081025 A1 | 3/2016 | Deng | |
| 2016/0198417 A1* | 7/2016 | Park | H04W 52/0238 370/311 |
| 2017/0055287 A1* | 2/2017 | Yang | H04W 74/0808 |
| 2017/0223630 A1 | 8/2017 | Thomson et al. | |

FOREIGN PATENT DOCUMENTS

| | | |
|---|---|---|
| CN | 103596632 A | 2/2014 |
| CN | 104115542 A | 10/2014 |
| CN | 104838700 A | 8/2015 |
| CN | 104871630 A | 8/2015 |

* cited by examiner

| ... | Period | Duration length | Initial position | ... |
|---|---|---|---|---|
| | I1 | I2 | I3 | |

FIG. 9

| Element identifier | Length | Control | Request type | Wake-up time | TWT group configuration | Minimum wake-up duration | TWT wake-up interval time | TWT channel | Scheduling |
|---|---|---|---|---|---|---|---|---|---|
| 1 | 1 | 1 | 2 | 8 or 0 | 9, 3 or 0 | 1 | 2 | 1 | 0 or 4 |

Byte

FIG. 10

| TWT request | TWT configuration command | Trigger | Implicit | Flow pattern | TWT identifier | TWT wake-up interval index | TWT protection |
|---|---|---|---|---|---|---|---|
| B0 | B1 B3 | B4 | B5 | B6 | B7 B9 | B10 B14 | B15 |
| 1 | 3 | 1 | 1 | 1 | 3 | 5 | 1 |

Bits

FIG. 11

WAKE-UP FRAME TRANSMISSION METHOD AND DEVICE

CROSS-REFERENCE TO RELATED APPLICATIONS

This application is a continuation of International Application No. PCT/CN2017/105647, filed on Oct. 11, 2017, which claims priority to Chinese Patent Application No. 201610896172.0, filed on Oct. 14, 2016. The disclosures of the aforementioned applications are hereby incorporated by reference in their entireties.

TECHNICAL FIELD

This application relates to the communications field, and more specifically, to a wake-up frame transmission method and devices.

BACKGROUND

The Institute of Electrical and Electronics Engineers (Institute of Electrical and Electronics Engineers, IEEE) 802.11 standard organization plans to add a low power (Low Power, LP) wake-up receiver (Wake-up Receiver, WUR) to a receive end device. After a primary transceiver module of the receive end device sleeps, the low power WUR wakes up and starts to work. If a transmit end device needs to communicate with the receive end device, the transmit end device first sends a wake-up frame (Wake-up frame) to the WUR. After correctly receiving the Wake-up frame that is sent to the WUR, the WUR sends a wake-up signal to the primary transceiver module to wake up the primary transceiver module of the receive end device, so that the transmit end device can communicate with the primary transceiver module of the receive end device, and the WUR sleeps.

In the prior art, a method for sending the wake-up frame to a WUR of the receive end device by the transmit end device is not provided, and therefore, a wake-up frame transmission method is urgently needed, so as to ensure quality of service (Quality of Service, QoS) performance of the wake-up frame.

SUMMARY

Embodiments of this application provide a wake-up frame transmission method and devices, so as to improve QoS performance of a wake-up frame.

According to a first aspect, a wake-up frame transmission method is provided. The method includes: determining, by a first device, an enhanced distributed channel access (EDCA) parameter set of a wake-up frame, where the wake-up frame is used to wake up one or more second devices to receive a data frame; determining, by the first device based on the EDCA parameter set of the wake-up frame, whether a channel resource is in an idle state; and sending, by the first device, the wake-up frame to the second device when the channel resource is in the idle state.

The first device determines the EDCA parameter set of the wake-up frame, where the wake-up frame is used to wake up one or more second devices to receive the data frame, determines, based on the EDCA parameter set of the wake-up frame, whether the channel resource is in the idle state, and sends the wake-up frame to the second device when the channel resource is in the idle state. In this way, the first device can perform channel resource contention based on the EDCA parameter set corresponding to the wake-up frame, so that a wake-up frame of a high priority can be served with a high priority, thereby improving QoS performance of the wake-up frame.

In one embodiment, when the wake-up frame is used to wake up one second device to receive a data frame sent by the first device, the method further includes: determining, by the first device, a channel access category of the data frame, where the channel access category of the data frame is corresponding to a first EDCA parameter set; and the determining, by a first device, an enhanced distributed channel access (EDCA) parameter set of a wake-up frame includes: determining, by the first device, the first EDCA parameter set as the EDCA parameter set of the wake-up frame.

In this embodiment of this application, an EDCA parameter set corresponding to the data frame is used as the EDCA parameter set of the wake-up frame, so that a wake-up frame corresponding to a data frame of a high priority can also be served with a high priority.

In one embodiment, when the wake-up frame is used to wake up each second device in a plurality of second devices to receive a data frame that is of a plurality of data frames sent by the first device and that is corresponding to each second device, the method further includes: determining, by the first device, a first channel access category in channel access categories of the plurality of data frames, where the first channel access category is corresponding to a second EDCA parameter set, and the first channel access category is a highest channel access category in the channel access categories of the plurality of data frames; and the determining, by a first device, an enhanced distributed channel access (EDCA) parameter set of a wake-up frame includes: determining, by the first device, the second EDCA parameter set as the EDCA parameter set of the wake-up frame.

In this embodiment of this application, for the wake-up frame that can wake up the plurality of second devices, channel contention may be performed based on an EDCA parameter set of a higher priority.

In one embodiment, the determining, by a first device, an enhanced distributed channel access (EDCA) parameter set of a wake-up frame includes: determining, by the first device, the EDCA parameter set corresponding to the highest channel access category of a system as the EDCA parameter set of the wake-up frame.

The first device may use the EDCA parameter set corresponding to the highest channel access category of the system as the EDCA parameter set of the wake-up frame, so that each wake-up frame can be served with a high priority during channel contention.

In one embodiment, the EDCA parameter set of the wake-up frame includes contention window duration and inter-frame space duration, and the determining, by the first device based on the EDCA parameter set of the wake-up frame, whether a channel resource is in an idle state includes: determining, by the first device, backoff duration based on the contention window duration; and determining, by the first device based on the inter-frame space duration and the backoff duration, whether the channel resource is in the idle state.

In this embodiment of this application, a media status is determined by using a physical carrier sense function and a virtual carrier sense function. In the contention window duration and the inter-frame space duration, the channel resource is idle, the channel resource is determined to be in the idle state, so as to ensure QoS performance of the wake-up frame transmitted to the second device.

In one embodiment, the EDCA parameter set of the wake-up frame includes an inter-frame space duration, and the determining, by the first device based on the EDCA parameter set of the wake-up frame, whether a channel resource is in an idle state includes: determining, by the first device based on the inter-frame space duration, whether the channel resource is in the idle state.

If the first device determines that the channel resource is idle in the inter-frame space duration, the channel resource is considered to be in the idle state, and then the first device may immediately send the wake-up frame to the second device; that is, the wake-up frame can be served with a high priority during channel contention.

According to a second aspect, this application provides a wake-up frame transmission method, and the method includes: sending, by a first device, indication information to at least one second device, where the indication information indicates a first time at which the first device sends a wake-up frame; and sending, by the first device, the wake-up frame at the first time.

The first device sends, to the second device, the indication information used to indicate the first time at which the first device sends the wake-up frame, and then sends the wake-up frame to the second device at the first time. In this way, the first device notifies, in advance, the second device of a time at which the wake-up frame is sent, so that the second device can accurately receive the wake-up frame based on the first time, thereby improving QoS performance of the wake-up frame.

In one embodiment, the indication information includes time information and frame type information, where the time information indicates the first time, and the frame type information indicates that a frame sent by the first device at the first time is the wake-up frame.

The first device sends the indication information to the at least one second device, where the indication information includes the time information and the frame type information. The time information indicates that the first device is ready to send the data frame at a time indicated by the time information, and the frame type information is used to indicate a frame type of the data frame sent by the first device at the time indicated by the time information. In other words, there is a correspondence between the time information and the frame type information.

In one embodiment, the sending, by a first device, indication information to at least one second device includes: sending, by the first device, target wake time (TWT) information to the at least one second device, where the TWT information carries the indication information.

The indication information sent by the first device to the at least one second device may be carried by using the TWT information. In this way, the first device does not need to separately send the indication information, thereby reducing power consumption of the first device.

In one embodiment, the frame type information includes at least one bit, and a value of the at least one bit is used to indicate whether the frame sent by the first device at the first time is the wake-up frame.

The first device may reuse a reserved value of a TWT identifier in the TWT information. The second device determines, based on the reserved value of the TWT identifier, whether the frame sent by the first device at the time indicated by the time information is the wake-up frame; that is, the second device determines whether the first time indicated by the indication information is used by the first device to send the wake-up frame. If the wake-up frame is sent by the first device at the first time, the second device determines, based on the first time, a second time at which the wake-up frame is received. In this way, the first device does not need to configure a dedicated resource for the frame type information, thereby reducing resource occupation of the indication information.

In one embodiment, the time information includes a duration length and a start time.

When the first time is time duration, the first device may determine a start time, a duration length, and the like of sending the wake-up frame, sends the wake-up frame to the second device, and indicates the first time by using the start time and the duration length.

In one embodiment, the time information includes a time period, a duration length, and a start time.

The first device may periodically send the wake-up frame, and sends the time period to the second device by using the time information.

According to a third aspect, this application provides a wake-up frame transmission method, and the method further includes: receiving, by a second device, indication information sent by a first device, where the indication information indicates a first time at which the first device sends a wake-up frame; determining, by the second device based on the first time, a second time at which the wake-up frame is received; and receiving, by the second device, the wake-up frame at the second time.

The second device receives the indication information that is sent by the first device and that is used to indicate the first time at which the first device sends the wake-up frame; the second device determines, based on the indication information, the second time at which the wake-up frame is received; and the second device receives, at the second time, the wake-up frame sent by the first device at the first time. In this way, the first device notifies, in advance, the second device of a time at which the wake-up frame is sent, so that the second device can accurately receive the wake-up frame based on the second time that is determined based on the first time, thereby improving QoS performance of the wake-up frame.

In one embodiment, the indication information includes time information and frame type information, where the time information indicates the first time, and the frame type information indicates that a frame sent by the first device at the first time is the wake-up frame.

The second device receives the indication information sent by the first device, where the indication information includes the time information and the frame type information. The time information indicates that the first device is ready to send the data frame at a time indicated by the time information, and the frame type information is used to indicate a frame type of the data frame sent by the first device at the time indicated by the time information. In other words, there is a correspondence between the time information and the frame type information.

In one embodiment, the receiving, by a second device, indication information sent by a first device includes: receiving, by the second device, target wake time (TWT) information sent by the first device, where the TWT information carries the indication information.

The indication information that is sent by the first device and that is received by the second device may be carried by using the TWT information. In this way, the first device does not need to separately send the indication information, thereby reducing power consumption of the first device.

In one embodiment, the frame type information includes at least one bit, and a value of the at least one bit is used to indicate whether the frame sent by the first device at the first time is the wake-up frame. Before the determining, by the second device based on the first time, a second time at which the wake-up frame is received, the method further includes: determining, by the second device based on the value of the at least one bit, that the first time is a time at which the first device sends the wake-up frame.

The first device may reuse a reserved value of a TWT identifier in the TWT information. The second device determines, based on the reserved value of the TWT identifier, whether the frame sent by the first device at the time indicated by the time information is the wake-up frame; that is, the second device determines whether the first time indicated by the indication information is used by the first device to send the wake-up frame. If the first time is used by the first device to send the wake-up frame, the second device determines, based on the first time, a second time at which the wake-up frame is received. In this way, the first device does not need to configure a dedicated resource for the frame type information, thereby reducing resource occupation of the indication information.

In one embodiment, the time information includes a duration length and a start time.

When the first time is time duration, the first device may determine a start time, a duration length, and the like of sending the wake-up frame, sends the wake-up frame to the second device, and indicates the first time by using the start time and the duration length.

In one embodiment, the time information includes a time period, a duration length, and a start time.

The first device may periodically send the wake-up frame, and sends the time period to the second device by using the time information.

According to a fourth aspect, this application provides a first device, and the first device includes a module configured to perform the method in the first aspect or any one of possible implementations of the first aspect.

According to a fifth aspect, this application provides a first device, and the first device includes a module configured to perform the method in the second aspect or any one of possible implementations of the second aspect.

According to a sixth aspect, this application provides a second device, and the second device includes a module configured to perform the method in the third aspect or any one of possible implementations of the third aspect.

According to a seventh aspect, this application provides a wake-up frame transmission system, and the system includes:

the first device and the second device according to the first aspect.

According to an eighth aspect, this application provides a wake-up frame transmission system, and the system includes:

the first device according to the second aspect and the second device according to the third aspect.

According to a ninth aspect, this application provides a first device, including: a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method in the first aspect or any one of possible implementations of the first aspect.

According to a tenth aspect, this application provides a first device, including: a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the processor performs the method in the second aspect or any one of possible implementations of the second aspect.

According to an eleventh aspect, this application provides a second device, including: a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method in the third aspect or any one of possible implementations of the third aspect.

According to a twelfth aspect, a computer storage medium is provided, where the computer storage medium stores program code, and the program code is used to indicate an instruction for performing the wake-up frame transmission method in the first aspect or any one of the possible implementations of the first aspect.

According to a thirteen aspect, a computer storage medium is provided, where the computer storage medium stores program code, and the program code is used to indicate an instruction for performing the wake-up frame transmission method in the second aspect or any one of the possible implementations of the second aspect.

According to a fourteenth aspect, a computer storage medium is provided, where the computer storage medium stores program code, and the program code is used to indicate an instruction for performing the wake-up frame transmission method in the third aspect or any one of the possible implementations of the third aspect.

Based on the foregoing technical solutions, the first device determines the EDCA parameter set of the wake-up frame, where the wake-up frame is used to wake up one or more second devices to receive the data frame, determines, based on the EDCA parameter set of the wake-up frame, whether the channel resource is in the idle state, and sends the wake-up frame to the second device when the channel resource is in the idle state. In this way, the first device can perform channel resource contention based on the EDCA parameter set corresponding to the wake-up frame, so that a wake-up frame of a high priority can be served with a high priority, thereby improving QoS performance of the wake-up frame.

BRIEF DESCRIPTION OF DRAWINGS

FIG. 9 is a schematic structural diagram of time information according to an embodiment of this application;

FIG. 10 is a schematic structural diagram of TWT information according to an embodiment of this application;

FIG. 11 is a schematic structural diagram of TWT information according to another embodiment of this application;

DESCRIPTION OF EMBODIMENTS

The following describes the technical solutions in this application with reference to the accompanying drawings.

The embodiments of this application may be applied to a wireless local area network (Wireless Local Area Network, WLAN). Currently, a standard used in the WLAN is the Institute of Electrical and Electronics Engineers (Institute of Electrical and Electronics Engineers, IEEE) 802.11 family. The WLAN may include a plurality of basic service sets (Basic Service Set, BSS). Network nodes in the basic service set include a station (Station, STA) and an access point (Access Point, AP). Each BSS may include one AP and a plurality of STAs associated with the AP.

In the embodiments of this application, a transmit end device is used as an example of the AP for description, but the transmit end device is not limited thereto. The AP may also be referred to as a wireless access point, a hotspot, or the like. The AP is an access point used by a mobile user to access a wired network, and is mainly deployed in a house, inside a building, and inside a campus, with a typical coverage radius of tens of meters to hundreds of meters. In one embodiment, the AP may also be deployed outdoors. The AP is equivalent to a bridge that connects a wired network and a wireless network. A main function of the AP is to connect wireless network clients together and then connect the wireless network to Ethernet. In one embodiment, the AP may be a terminal device or a network device with a Wireless Fidelity (Wireless Fidelity, Wi-Fi) chip. In one embodiment, the AP may be a device that supports an 802.11ax standard. Further, in one embodiment, the AP may be a device that supports a plurality of WLAN standards, such as 802.11ac, 802.11n, 802.11g, 802.11b, 802.11a, and a later version.

In the embodiments of this application, a receive end device is used as an example of the STA for description, but the receive end device is not limited thereto. The STA may be a wireless communications chip, a wireless sensor, or a wireless communications terminal. For example, a mobile phone that supports a Wi-Fi communication function, a tablet computer that supports a Wi-Fi communication function, a set top box that supports a Wi-Fi communication function, a smart TV that supports a Wi-Fi communication function, a wearable smart device that supports a Wi-Fi communication function, a vehicular communications device that supports a Wi-Fi communication function, or a computer that supports a Wi-Fi communication function. In one embodiment, the station may support the 802.11ax standard. Further, in one embodiment, the station supports a plurality of WLAN standards, such as 802.11ac, 802.11n, 802.11g, 802.11b, 802.11a, and a later version.

Figure 1:
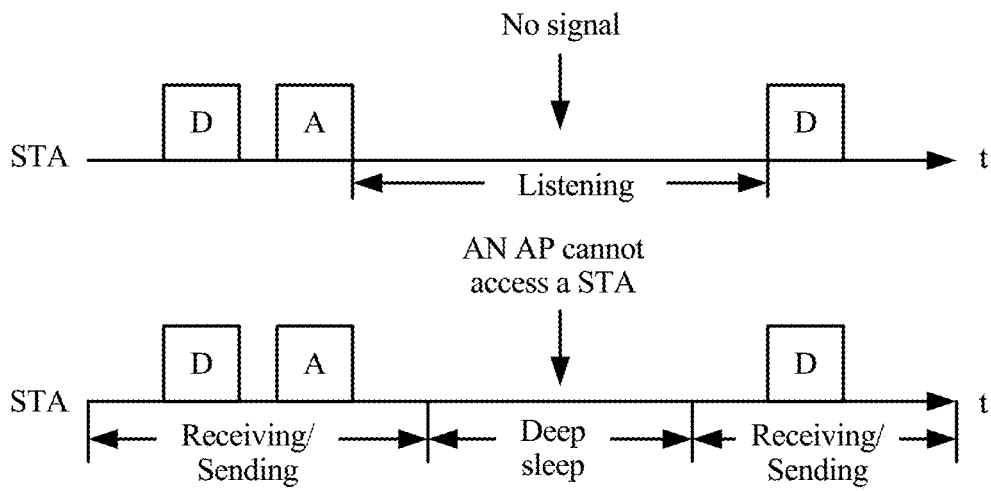
FIG. 1 is a schematic diagram of a wake-up frame transmission method in the prior art.

As shown in FIG. 1, in a Wireless Fidelity (Wireless Fidelity, Wi-Fi) network, when a device (for example, a station (Station, STA)) does not receive or transmit a message, continuous channel listening consumes considerable energy. Therefore, a policy for optimizing sleep of device is proposed in the IEEE802.11 protocol, that is, a sleep schedule is introduced so that the STA may deeply sleep when no data is received or transmitted, so as to reduce energy consumption of continuous channel listening. However, when the STA is in deep sleep, the AP cannot communicate with the STA, and transmission between the AP and the STA may be performed only when the STA wakes up. This may result in specific latency. To avoid high latency caused by the sleep mechanism, the STA generally follows a specific sleep policy and wakes up from time to time to check whether data needs to be received or transmitted. However, this reduces sleep efficiency of the STA. For example, when no data needs to be received or transmitted but the STA wakes up from time to time, more energy is consumed when compared with a case in which the STA keeps sleeping.

Figure 2:
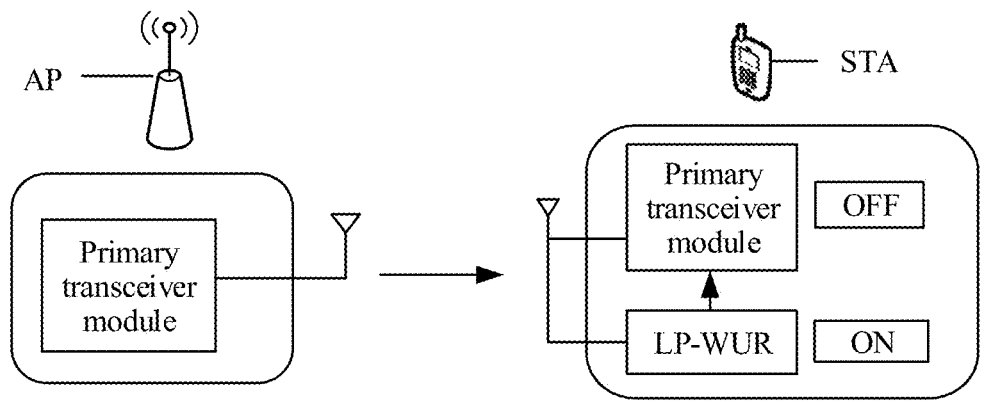
FIG. 2 is a schematic diagram of an application scenario according to an embodiment of this application.

The IEEE 802.11 Working Group uses a low power wake-up receiver (LP-WUR, Low Power Wake-Up Receiver) as a core technology for reducing power consumption of Wi-Fi. That is, in addition to optimizing a sleep policy, another technical approach of reducing energy waste caused by non-signal listening of a device is using the LP-WUR. As shown in FIG. 2, the LP-WUR (which may also be referred to as "WUR") is added to a receive end device (for example, the STA), in addition to including a conventional 802.11 transceiver end (that is, a primary transceiver module, or a Wi-Fi primary transceiver module). When the primary transceiver module deeply sleeps, the low power WUR wakes up and starts to work. If another device (for example, the AP in FIG. 1) needs to communicate with a device with the WUR and the primary transceiver module (for example, the STA in FIG. 2), the AP first sends a WUR wake-up frame (Wake-Up frame, WUF) to the WUR. After correctly receiving the Wake-up frame that is sent to the WUR, the WUR awakes the primary transceiver module of the STA, and then gets into sleep, and the AP communicates with the waking primary transceiver module. When the communication with the AP is completed, the primary transceiver module sleeps. At the same time, the WUR wakes up and starts to sense whether a wake-up frame is sent to the WUR to wake up the primary transceiver module.

Figure 3:
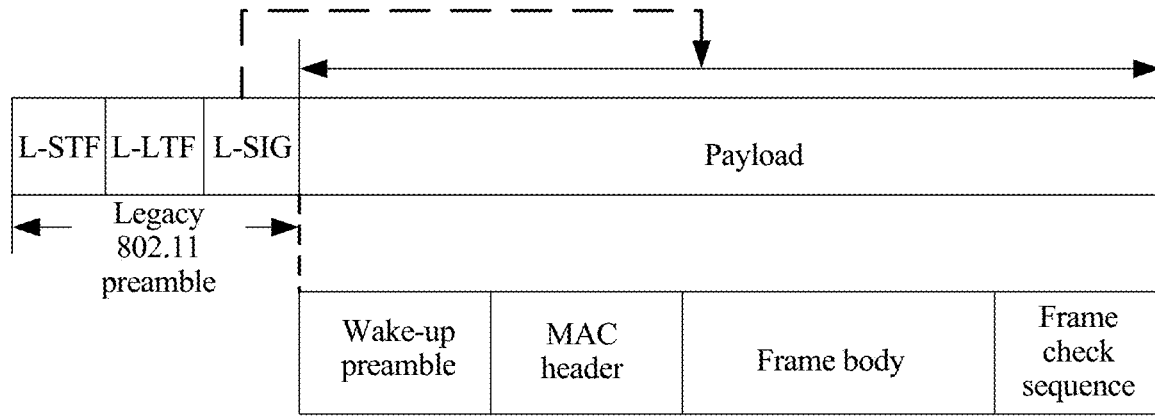
FIG. 3 is a schematic diagram of a frame structure of a wake-up frame according to an embodiment of this application.

To implement low power consumption, a circuit structure, a frame structure design (such as the Wake-up frame), and the like of the WUR needs to have low complexity. A circuit structure of the WUR may include only an energy detection part and a radio frequency part, and is not used to demodulate a complex modulation scheme. The wake-up frame may use a binary on-off keying (On-Off Keying, OOK) modulation scheme with a relatively low transmission rate. For example, FIG. 3 shows a possible frame structure of the wake-up frame. The conventional 802.11 preamble in FIG. 3 may be understood by another surrounding 802.11 device, and is used to ensure that a subsequent part is awoken without interference from the conventional 802.11 device. The conventional 802.11 preamble may include a legacy short training field (Legacy Short Training Field, L-STF), a legacy long training field (Legacy Long Training Field, L-LTF), and a legacy signal field (Legacy Signal Field, L-SIG). It should be noted that, the surrounding 802.11 device that hears the preamble does not occupy a channel in a period of time. The payload (payload) part of the wake-up frame follows the 802.11 preamble. The payload is modulated by using the OOK modulation scheme, and can only be understood by the WUR. The payload part may include a wake-up preamble (Wake-Up Preamble), a Media Access Control header (Media Access Control Header, MAC Header), a frame body (frame body), and a frame check sequence (Frame Check Sequence, FCS). The wake-up preamble is used to identify a wake-up frame signal. The MAC Header is equivalent to a WUR identity (Identity, ID), and is used to distinguish between different WURs. The frame body may be used to carry some other information. The frame check sequence is used to ensure that received data is consistent with transmitted data. The WUR ID may be a complete network identifier or a short network identifier of the WUR, or may be other information that can be used to distinguish between different WURs. After receiving the wake-up frame, a WUR needs to check the WUR ID in the wake-up frame. The wake-up frame can awake the primary transceiver module only when the WUR ID in the wake-up frame matches the ID of the WUR.

In addition, the AP may also send a group of wake-up frames to wake up a group of STAs. The group of wake-up frames needs to carry WUR IDs (or WUR group ID) of a plurality of WURs, so that the plurality of WURs can simultaneously awake. For example, the AP may send a wake-up beacon (Wake-Up Beacon, WB) frame, and may further carry some basic information when awaking a group of STAs, so that the wake-up beacon is used for information updating after being received by the WUR.

To ensure that the AP and the STA can access a wireless medium (wireless medium) (that is, a network resource) without colliding with each other, a carrier sense multiple access with collision avoidance (Carrier Sense Multiple Access with Collision Avoidance, CSMA/CA) mechanism is used in 802.11, and the mechanism is referred to as a distributed coordination function (Distributed Coordination Function, DCF). When a STA is ready to send data, clear channel assessment (Clear Channel Assessment, CCA) is first performed by sensing the wireless medium for fixed duration. If a state of the media is idle, the STA considers that the STA can use the media and starts to exchange frames. If the state of the media is busy, the STA waits for the media to change to an idle state, delays for fixed duration, and further waits for random backoff (backoff, BO) duration. If the media remains in the idle state in a delay of the fixed duration and the backoff duration, the STA considers that the STA can use the media and starts to exchange frames.

Figure 4:
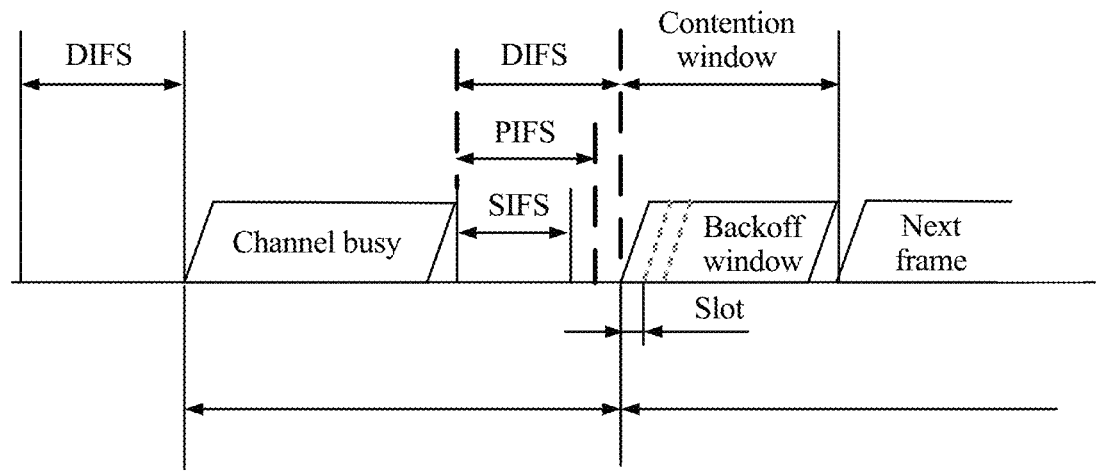
FIG. 4 is a schematic diagram of a wake-up frame transmission method in the prior art.

A basis of the CSMA/CA is carrier sense (Carrier Sense, CS). The DCF determines the state of the media by using both a physical carrier sense function and a virtual carrier sense function. The physical carrier sense function is located at the physical layer (Physical layer, PHY), and determines, through the energy detection (Energy Detection, ED) and preamble detection (Preamble Detection, PD), whether the media is busy. The virtual carrier sense function is located in the MAC, and uses predetermined information carried in a duration field of the MAC frame header, where the information declares exclusive access to the media. The virtual carrier sense function is referred to as a network allocation vector (Network Allocation Vector, NAV). A channel is considered to be idle only when both a physical carrier sense mechanism and a virtual carrier sense mechanism consider that the channel is idle. If only the physical carrier sense mechanism or the virtual carrier sense mechanism considers that the channel is idle, the channel is considered to be busy. A basic access method is shown in FIG. 4, where a DCF inter-frame space (DCF inter-frame space, DIFS), a point coordination function inter-frame space (Point coordination function inter-frame space, PIFS), and a short inter-frame space (short inter-frame space, SIFS) are different fixed duration for different types of frames.

Figure 5:
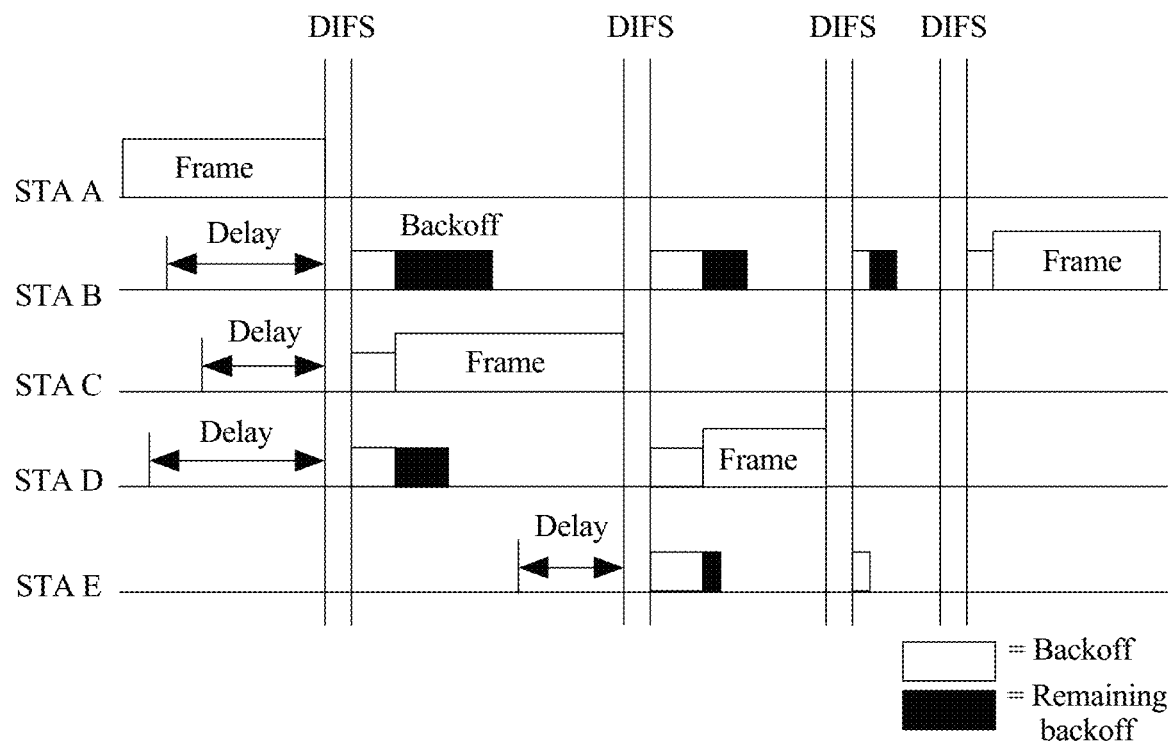
FIG. 5 is a schematic diagram of a wake-up frame transmission method in the prior art.
Figure 6:
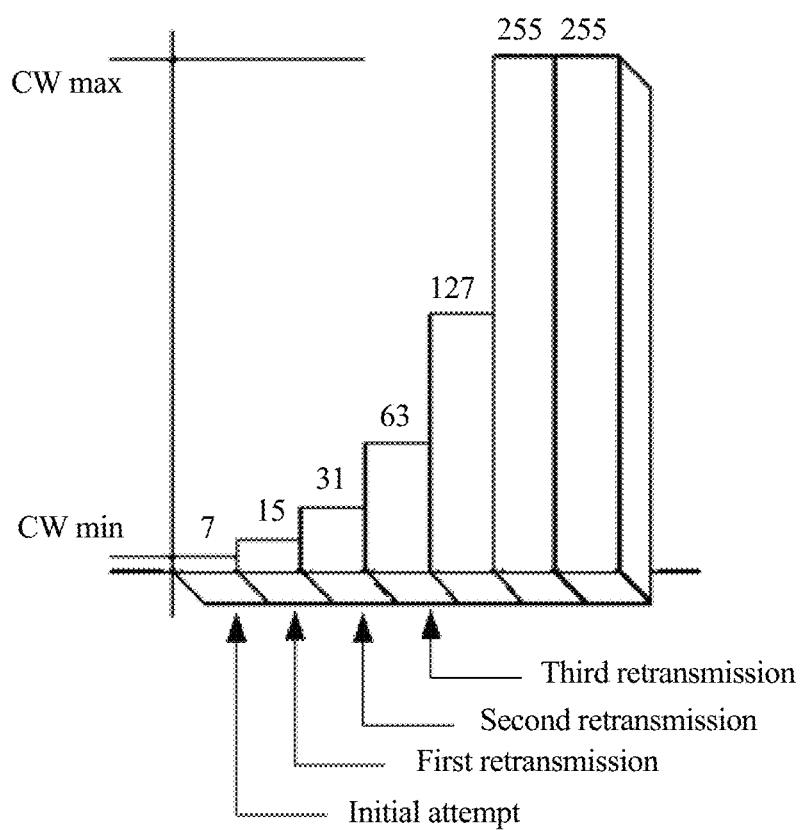
FIG. 6 is a schematic diagram of a wake-up frame transmission method in the prior art.

A backoff mechanism in a DCF between a plurality of STAs is shown in FIG. 5. A random backoff time for which the STA needs to back off is obtained by multiplying a random backoff value by a time of each slot, where the random backoff value is randomly selected from an evenly distributed window [0, CW]. A contention window (Contention Window, CW) includes a plurality of values, and a minimum value, that is, CWmin, is used when an initial attempt (Initial Attempt) is performed. However, retransmission (Retransmission) needs to be performed each time a conflict occurs each time. If this case lasts, the CW increases each time until it increases to a maximum value of the CW, that is, CWmax. However, when data is successfully sent, the CW is reset (reset) to CWmin. A size of each window is that the Nth power of 2 minus 1, and is approximately twice a size of a previous level (which may be referred to as "window doubling"), as shown in FIG. 6.

Enhanced distributed channel access (enhanced distributed channel access, EDCA) is an enhancement of a DCF mechanism, which allows services of different access categories (access category, AC) to have different EDCA parameter sets, for example, the AC includes background (AC BK), best effort (AC BE), video (AC VI), voice (AC VO), and Legacy (Legacy). The EDCA parameter set includes CWmin, CWmax, arbitrary inter-frame space (arbitrary inter-frame space, AIFS), transmit opportunity limit (transmit opportunity limit, TXOP limit), and the like. The TXOP limit indicates that after a channel resource is idle, if a plurality of frames need to be sent, total duration for occupying a channel cannot exceed the TXOP limit value. EDCA parameters of different ACs are shown in Table 1.

TABLE 1

| AC | CWmin | CWmax | AIFSN | TXOP limit |
|---|---|---|---|---|
| AC BK | 31 | 1023 | 7 | 0 |
| AC BE | 31 | 1023 | 3 | 0 |
| AC VI | 15 | 31 | 2 | 3.008 ms |
| AC VO | 7 | 15 | 2 | 1.504 ms |
| Legacy | 15 | 1023 | 2 | 0 |

For a service of a specific AC (that is, a known category), a backoff process of the service is basically the same as the backoff process of the DCF, and a difference lies in that the AIFS replaces the DIFS in the DCF, that is, when a channel returns to idle again, the STA needs to wait for the AIFS to perform the backoff process. A method for calculating the AIFS is AIFS[AC]=aSIFSTime+AIFSN[AC]*aSlotTime.

For example, for a service whose access category is AC_BE, an EDCA parameter set of the service is {CWmin=31, CWmax=1023, and AIFSN=3}. Therefore, in an EDCA backoff process, the AIFS is aSIFSTime+3*aSlotTime, that is, when a channel returns to idle again, the STA needs to wait for aSIFSTime+3*aSlotTime to perform the backoff process. In addition, an initial value of a backoff counter of the service should be randomly generated within [0, 31].

An embodiment of this application provides a wake-up frame transmission method, so as to ensure quality of service (Quality of Service, QoS) performance of the wake-up frame.

Figure 7:
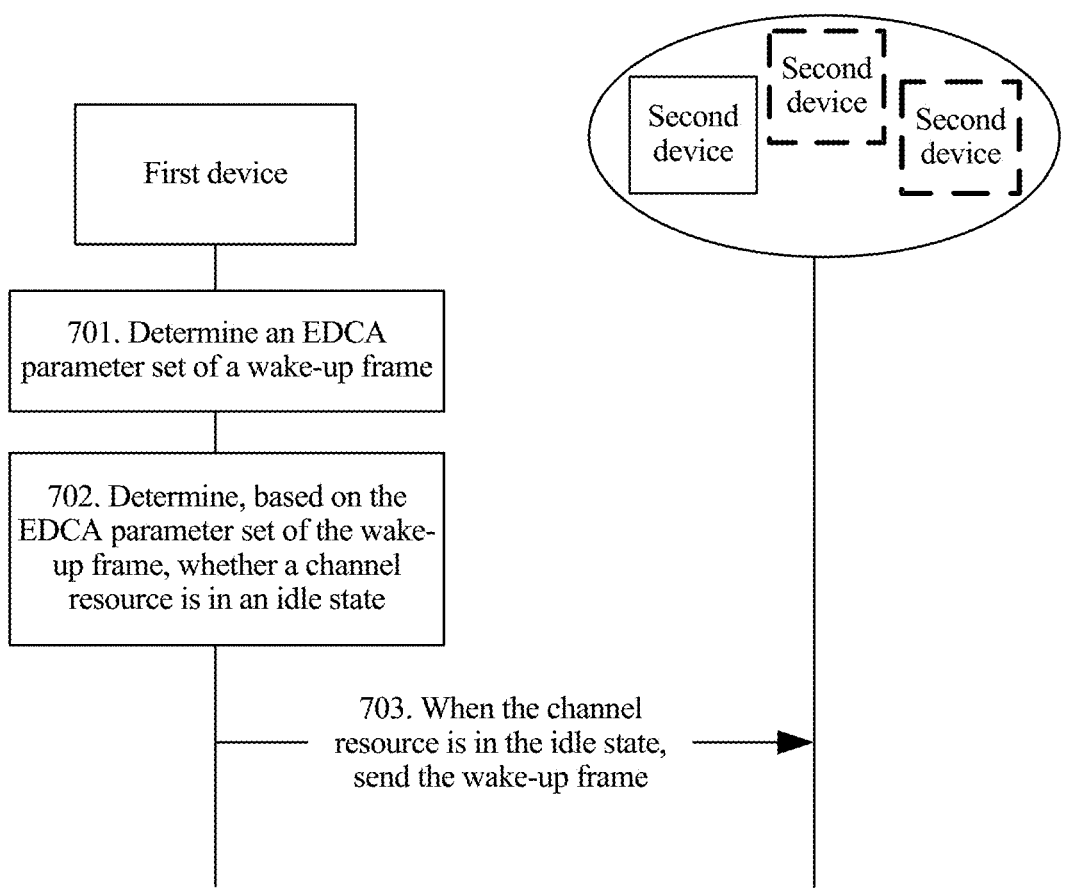
FIG. 7 is an interaction flowchart of a wake-up frame transmission method according to an embodiment of this application.

FIG. 7 is a schematic flowchart of a wake-up frame transmission method according to an embodiment of this application.

Block 701. A first device determines an EDCA parameter set of a wake-up frame, where the wake-up frame is used to wake up one or more second devices to receive a data frame.

The first device may preset a mapping relationship between different wake-up frames and the EDCA parameter set, or the first device determines a mapping relationship between different wake-up frames and the EDCA parameter set based on some parameters corresponding to the wake-up frame. The first device can determine, based on the mapping relationship, an EDCA parameter set corresponding to each wake-up frame. The wake-up frame may be used to wake up one second device to receive a data frame, or may be used to wake up a plurality of second devices to receive data frames. Data frames sent by the first device to the plurality of second devices may be the same, or may be different. This is not limited in this application.

The first device includes a primary transceiver module, and the second device includes a primary transceiver module and a WUR module. Alternatively, the first device may further include a WUR module. The first device is a device that sends the wake-up frame, and the second device is a device that receives the wake-up frame. The primary transceiver module of the second device is in a sleep state before being awoken. The primary transceiver module of the second device is awoken when the WUR module of the second device receives the wake-up frame, and then the first device can communicate with the primary transceiver module of the second device.

It should be understood that, the first device may be an AP (for example, a router), and the second device may be a STA (for example, a mobile phone). Alternatively, the first device may be a STA (for example, a mobile phone), and the second device may be a wearable device (for example, a band). The first device and the second device may further be another device that has the foregoing corresponding function. However, this application is not limited thereto.

Alternatively, in some scenarios, the two devices may both have WUR transceiving capabilities, and roles of the two devices depend on a current communications scenario. For example, both a mobile phone and a band may have the WUR transceiving capabilities, and both have power saving requirements. Therefore, the mobile phone and the band may both run in a WUR working mode, but need to notify the other party of a wake-up window of the mobile phone or the band. Specifically, when the mobile phone sends data to the band, the mobile phone sends a wake-up frame to the band in a wake-up window of the band; and in this case, the mobile phone is the first device, and the band is the second device. When the band sends data to the mobile phone, the band sends a wake-up frame to the mobile phone in a wake-up window of the mobile phone; and in this case, the band is the first device, and the mobile phone is the second device.

In one embodiment, when the wake-up frame is used to wake up the second device to receive a first data frame sent by the first device, the method further includes that: The first device determines a channel access category of the first data frame, where the channel access category of the first data frame is corresponding to a first EDCA parameter set; and that the first device determines the EDCA parameter set of the wake-up frame includes that: The first device determines the first EDCA parameter set as the EDCA parameter set of the wake-up frame.

In one embodiment, if the wake-up frame is a wake-up frame (which may be referred to as an individually addressed wake-up frame (individually addressed Wake-up frame, IWF) for one second device, the wake-up frame is used to wake up the second device to receive a data frame (which is indicated as the first data frame). The first device determines the channel access category of the first data frame, where the EDCA parameter set corresponding to the channel access category of the first data frame is indicated as the first EDCA parameter set (as shown in Table 1), and the first device uses the first EDCA parameter set as the EDCA parameter set of the wake-up frame.

In one embodiment, in an embodiment, when the wake-up frame is used to wake up each second device in the plurality of second devices to receive a data frame that is of a plurality of data frames sent by the first device and that is corresponding to each second device, the method further includes that: The first device determines a first channel access category in channel access categories of the plurality of data frames, where the first channel access category is corresponding to a second EDCA parameter set, and the first channel access category is a highest channel access category in the channel access categories of the plurality of data frames; and that the first device determines the EDCA parameter set of the wake-up frame includes that: The first device determines the second EDCA parameter set as the EDCA parameter set of the wake-up frame.

In one embodiment, if the wake-up frame is a wake-up frame (which may be referred to as a "WB") for the plurality of second devices, the WB is used to wake up the plurality of second devices to receive the data frame that is of the plurality of data frames sent by the first device and that is corresponding to each second device. In this case, the first device may determine the highest channel access category (which is indicated as the first channel access category) in the channel access categories of the plurality of data frames, and an EDCA parameter set (which is indicated as the second EDCA parameter set) corresponding to the highest channel access category. In this way, the first device may determine the second EDCA parameter set as the EDCA parameter set of the wake-up frame. That is, for the wake-up frame that can awake the plurality of second devices, channel contention may be performed based on an EDCA parameter set of a higher priority.

In one embodiment, that the first device determines the EDCA parameter set of the wake-up frame includes that: The first device determines the EDCA parameter set corresponding to the highest channel access category of a system as the EDCA parameter set of the wake-up frame.

In one embodiment, in an embodiment, that the first device determines the EDCA parameter set of the wake-up frame includes that: The first device determines the EDCA parameter set corresponding to the highest channel access category of a system as the EDCA parameter set of the wake-up frame.

In one embodiment, the first device may alternatively determine an EDCA parameter set corresponding to any access category as the EDCA parameter set of the wake-up frame.

Whether the wake-up frame is an IWF for one second device or a WB for the plurality of second devices, the first device may use the EDCA parameter set corresponding to the highest channel access category or any access category in the system as the EDCA parameter set of the wake-up frame, so that each wake-up frame can be served with a high priority during channel contention or be provided with another appropriate channel service.

For example, for the WB, the first device may directly determine a parameter set corresponding to the AC_VO (that is, a highest channel access category in the system) as the EDCA parameter set of the WB.

It should be understood that, the first device may alternatively separately configure an EDCA parameter set for the wake-up frame, that is, wake-up frames corresponding to different second devices respectively have corresponding EDCA parameter sets. This is not limited in this application.

Block 702. The first device determines, based on the EDCA parameter set of the wake-up frame, whether a channel resource is in an idle state.

The first device determines, based on the EDCA parameter set of the wake-up frame, whether the channel resource is idle. Alternatively, the first device may perform backoff based on each parameter in the EDCA parameter set of the wake-up frame (as shown in FIG. 5 and FIG. 6), and successful backoff means that the channel is successfully obtained through contention.

In one embodiment, the EDCA parameter set of the wake-up frame includes contention window duration and inter-frame space duration; and that the first device determines, based on the EDCA parameter set of the wake-up frame, whether the channel resource is in the idle state includes that: When the channel resource is idle in the contention window duration and the inter-frame space duration, the first device determines that the channel resource is in the idle state.

In one embodiment, the EDCA parameter set of the wake-up frame includes the contention window duration and the inter-frame space duration. In one embodiment, the contention window duration includes a minimum value of the contention window duration and a maximum value of the contention window duration. A specific implementation process may be shown in FIG. 5. A random backoff time for which the STA needs to back off is obtained by multiplying a random backoff value by a time of each slot. The random backoff value is randomly selected from an evenly distributed window [0, CW]. There are a plurality of CW values. The minimum value, that is, CWmin, is used when an initial attempt is performed. However, retransmission needs to be performed each time a conflict occurs. If this case lasts, the CW increases each time until it increases to the maximum value of the CW, that is, CWmax. However, when data is successfully sent, the CW is reset (reset) to CWmin.

The inter-frame space duration may be a DIFS, a PIFS, a SIFS, an AIFS, or the like. When determining that the channel is idle after the inter-frame space duration, the first device determines backoff duration based on target conten-tion window duration. The first device may determine the target contention window duration as the backoff duration, and starts countdown by using a backoff timer. If the channel is busy, the backoff timer needs to be suspended (that is, stop timing) until the backoff timer expires. If the channel resource is still idle, the channel resource is determined to be in the idle state; if the channel resource is not idle, the channel resource is considered to be in a busy state.

In one embodiment, in an embodiment, the EDCA parameter set of the wake-up frame includes inter-frame space duration; and that the first device determines, based on the EDCA parameter set of the wake-up frame, whether the channel resource is idle includes that: The first device determines, based on whether the channel resource is in the idle state in the inter-frame space duration, whether the channel resource is in the idle state.

In one embodiment, the first device may determine, based on the inter-frame space duration included in the EDCA parameter set of the wake-up frame, whether the channel resource is idle. In other words, if the first device determines that the channel resource is idle in the inter-frame space duration, the channel resource is considered to be in the idle state, and then the first device may immediately send the wake-up frame to the second device.

It should be noted that, the inter-frame space may be any one of the following: the DIFS, the PIFS, the SIFS, or the AIFS. This is not limited in this application.

Block 703. The first device sends the wake-up frame to the second device when the channel resource is in the idle state.

After receiving the wake-up frame by using the WUR module, the second device sends a wake-up signal to the primary transceiver module, so that the primary transceiver module is in a waking state, and can receive the data frame sent by the first device.

Therefore, according to the wake-up frame transmission method in this embodiment of this application, the first device determines the EDCA parameter set of the wake-up frame, where the wake-up frame is used to wake up one or more second devices to receive the data frame, determines, based on the EDCA parameter set of the wake-up frame, whether the channel resource is in the idle state, and sends the wake-up frame to the second device when the channel resource is in the idle state. In this way, the first device can perform channel resource contention based on the EDCA parameter set corresponding to the wake-up frame, so that a wake-up frame of a high priority can be served with a high priority, thereby improving QoS performance of the wake-up frame.

Figure 8:
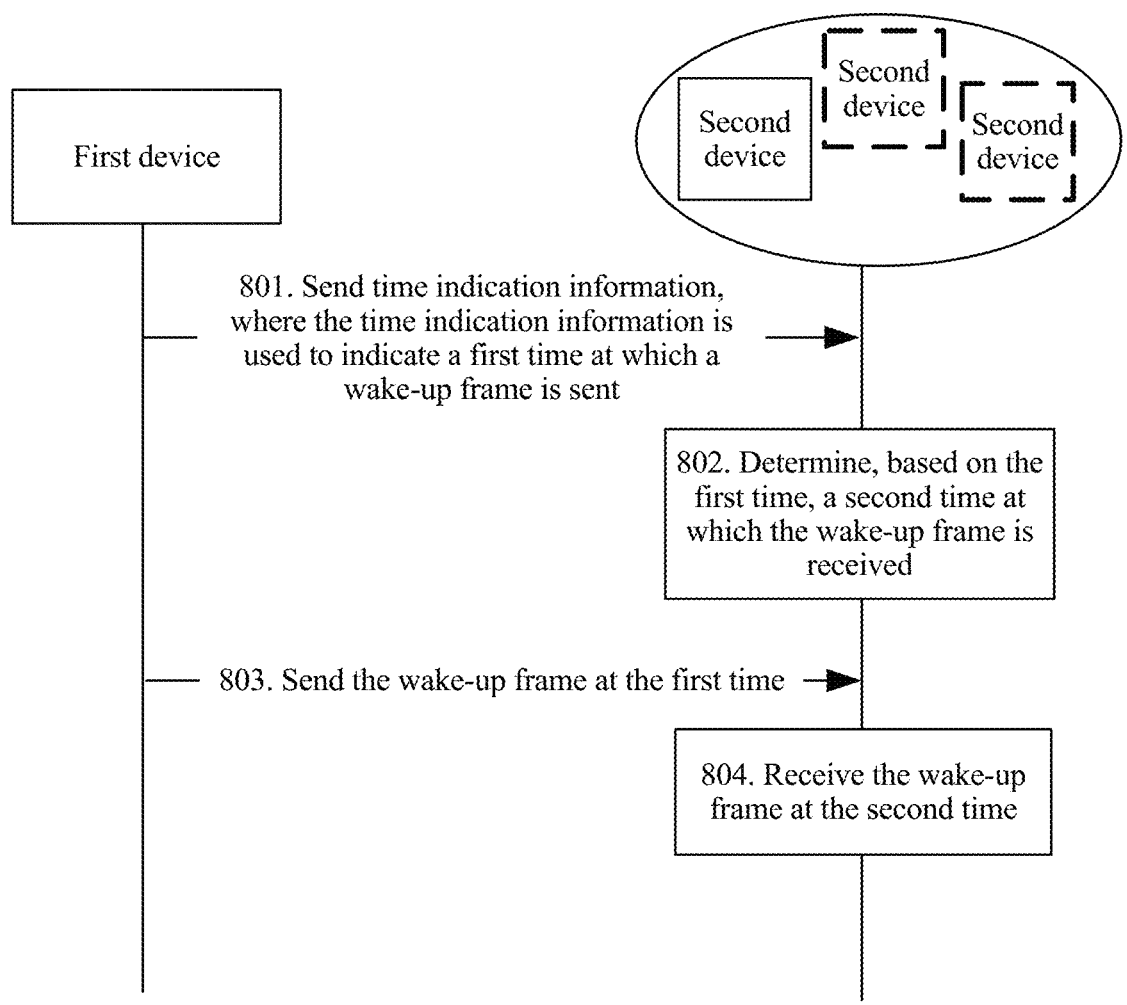
FIG. 8 is an interaction flowchart of a wake-up frame transmission method according to another embodiment of this application.

FIG. 8 is a schematic flowchart of a wake-up frame transmission method according to another embodiment of this application.

Block 801. A first device sends indication information to at least one second device, where the indication information is used to indicate a first time at which the first device sends a wake-up frame.

The first time may be one or more specific time points, or may be one or more time duration. This is not limited in this application.

In one embodiment, the indication information includes time information and frame type information, where the time information indicates the first time, and the frame type information indicates that a frame sent by the first device at the first time is the wake-up frame.

The first device sends the indication information to the at least one second device, where the indication information includes the time information and the frame type information. The time information indicates that the first device is ready to send the data frame at a time indicated by the time information, and the frame type information is used to indicate a frame type of the data frame sent by the first device at the time indicated by the time information. In other words, there is a correspondence between the time information and the frame type information.

In one embodiment, that the first device sends the indication information to the at least one second device includes that: The first device sends target wake time (TWT) information to the at least one second device, where the TWT information carries the indication information.

The indication information sent by the first device to the at least one second device may be carried by using the TWT information. A structure of the TWT information in an 802.ax system is shown in FIG. 10 and FIG. 11. A position of the time information in the TWT information is a wake-up time in FIG. 10, and a position of the frame type information in the TWT information is a request type in FIG. 10.

It should be understood that, the first device may alternatively carry the indication information by using a broadcast frame or a beacon frame. This is not limited in this application.

In one embodiment, the time information may include a duration length and a start time.

When the first time is time duration, the first device may determine a start time, a duration length, and the like of sending the wake-up frame, sends the wake-up frame to the second device, and indicates the first time by using the start time and the duration length.

In one embodiment, the time information may include a time period, a duration length, and a start time. The first device may periodically send the wake-up frame, and send the time period to the second device by using the time information.

It should be understood that, the time period, the duration length, and the start time of the first time that are used to instruct the first device to send the wake-up frame may be indicated by using the same indication information, or may be separately indicated by using the indication information. For example, a structure of the broadcast frame is shown in FIG. 9. I1 in the broadcast frame is used to indicate a period of the duration, I2 is used to indicate a length of the duration, and I3 is used to indicate a start time of the duration.

Block 802. The second device determines, based on the first time, a second time at which the wake-up frame is received.

The second device may wake up, based on the indication information, at a start time at which the first device sends the wake-up frame, or may wake up in advance to be ready to receive the wake-up frame, so as to ensure accuracy of receiving the wake-up frame. Alternatively, after latency between the first device and the second device is accurately calculated, the second device may wake up after the latency, so as to reduce power consumption of the second device.

It should be understood that, the second time may be one or more specific time points, or may be one or more time duration, and the second time may further be the same as the first time. This is not limited in this application.

In one embodiment, the frame type information includes at least one bit, and a value of the at least one bit is used to indicate whether the frame sent by the first device at the first time is the wake-up frame. Before the second device determines, based on the first time, the second time at which the wake-up frame is received, the method further includes that: The second device determines, based on the value of the at least one bit, that the first time is a time at which the first device sends the wake-up frame.

In one embodiment, the frame type information may be represented by at least one bit. In particular, when the indication information is carried in the TWT information, the second device may reuse a reserved value of a TWT identifier in the TWT information.

The second device determines, based on the reserved value of the TWT identifier, whether the frame sent by the first device at the time indicated by the time information is the wake-up frame; that is, the second device determines whether the first time indicated by the indication information is used by the first device to send the wake-up frame. If the first time is used by the first device to send the wake-up frame, the second device determines, based on the first time, the second time at which the wake-up frame is received.

The structure of the TWT information in the 802.ax system is shown in FIG. 10, and a specific structure of the request type is shown in FIG. 11. At least one bit is corresponding to the TWT identifier. That three bits are corresponding to the TWT identifier is used as an example for description, and a value of the TWT identifier may be shown in Table 2.

TABLE 2

| Value of a TWT identifier (TWT Flow Identifier field value) | Frame type description |
| --- | --- |
| 0 (000) | A frame sent in TWT duration may be any type. |
| 1 (001) | It is recommended that the frame sent in the TWT duration be an energy-saving polling frame, a channel quality information frame, a buffer information frame, a channel measurement feedback frame, or an action frame. A resource used for random access is not allocated for a trigger frame. |
| 2 (010) | It is recommended that the frame sent in the TWT duration be an energy-saving polling frame, a channel quality information frame, a buffer information frame, a channel measurement feedback frame, or an action frame. At least one resource used for random access is allocated for a trigger frame. |
| 3-7 | Reserved |

It can be learned from Table 2 that bit values 3 to 7 of the TWT identifier are reserved values. In this embodiment of this application, the reserved values may be reused, and a mapping relationship between a reserved value and the wake-up frame is configured. For example, the value of the TWT identifier is configured to be 3 to indicate that the frame sent by the first device at the first time is a wake-up frame (as shown in Table 3). In this way, the second device may determine, based on the first time, the second time at which the wake-up frame is received, so that the second device can accurately receive the wake-up frame.

TABLE 3

| Value of a TWT identifier | Frame type description |
| --- | --- |
| Any value from 3 to 7 | In a TWT service phase, a transmitted frame is a wake-up frame |

Block 803. The first device sends the wake-up frame at the first time.

The first device sends the wake-up frame at a time (which is indicated as the first time) indicated to the second device.

It should be noted that, before sending the wake-up frame, the first device may further send a channel reservation frame to the second device to reserve a channel, so as to ensure that the wake-up frame can be sent. The channel reservation frame may be a clear to send (clear to send, CTS) frame, and the channel reservation frame may further carry NAV information.

Block 804. The second device receives the wake-up frame at the second time.

The second device wakes up and receives the wake-up frame at the second time. That is, the first device may negotiate, in advance, a time for sending the wake-up frame with the second device, so that the second device wakes up and receives the wake-up frame at the negotiated time, thereby avoiding that a WUR module of the second device is always in a listening state, and further reducing power consumption of the second device.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Therefore, according to the wake-up frame transmission method in this embodiment of this application, the first device sends, to the second device, the indication information used to indicate the first time at which the first device sends the wake-up frame; the second device determines, based on the indication information, the second time at which the wake-up frame is received; and the second device receives, at the second time, the wake-up frame sent by the first device at the first time. In this way, the first device notifies, in advance, the second device of the time at which the wake-up frame is sent, so that the second device can accurately receive the wake-up frame based on the second time that is determined based on the first time, thereby improving QoS performance of the wake-up frame.

The foregoing has described in detail the wake-up frame transmission method according to the embodiments of this application. The following describes wake-up frame transmission devices according to the embodiment of this application.

Figure 12:
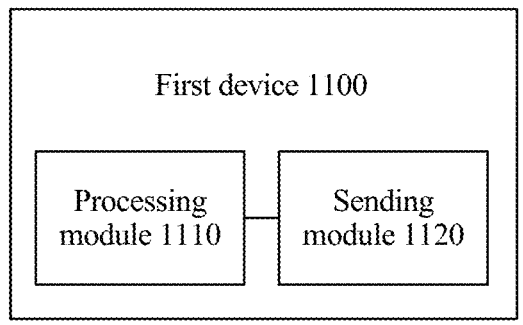
FIG. 12 is a schematic block diagram of a first device according to an embodiment of this application.

FIG. 12 is a schematic block diagram of a first device 1100 according to an embodiment of this application. As shown in FIG. 12, the first device 1100 includes:

a processing module 1110, configured to determine an enhanced distributed channel access EDCA parameter set of a wake-up frame, where the wake-up frame is used to wake up one or more second devices to receive a data frame, where the processing module 1110 is further configured to determine, based on the EDCA parameter set of the wake-up frame, whether a channel resource is in an idle state; and a sending module 1120, configured to send the wake-up frame to the second device when the channel resource is in the idle state.

Therefore, the first device in this embodiment of this application determines the EDCA parameter set of the wake-up frame, where the wake-up frame is used to wake up one or more second devices to receive the data frame, determines, based on the EDCA parameter set of the wake-up frame, whether the channel resource is in the idle state, and sends the wake-up frame to the second device when the channel resource is in the idle state. In this way, the first device can perform channel resource contention based on the EDCA parameter set corresponding to the wake-up frame, so that a wake-up frame of a high priority can be served with a high priority, thereby improving QoS performance of the wake-up frame.

In one embodiment, when the wake-up frame is used to wake up one second device to receive a first data frame sent by the first device, the processing module is further configured to determine a channel access category of the first data frame, where the channel access category of the first data frame is corresponding to a first EDCA parameter set; and the processing module is specifically configured to determine the first EDCA parameter set as the EDCA parameter set of the wake-up frame.

In one embodiment, when the wake-up frame is used to wake up each second device in a plurality of second devices to receive a data frame that is of a plurality of data frames sent by the first device and that is corresponding to each second device, the processing module is further configured to determine a first channel access category in channel access categories of the plurality of data frames, where the first channel access category is corresponding to a second EDCA parameter set, and the first channel access category is a highest channel access category in the channel access categories of the plurality of data frames; and the processing module is specifically configured to determine the second EDCA parameter set as the EDCA parameter set of the wake-up frame.

In one embodiment, the processing module is specifically configured to determine the EDCA parameter set corresponding to the highest channel access category of a system as the EDCA parameter set of the wake-up frame.

In one embodiment, the EDCA parameter set of the wake-up frame includes contention window duration and inter-frame space duration; and the processing module is specifically configured to: determine backoff duration based on the contention window duration; and determine, based on the backoff duration and the inter-frame space duration, that the channel resource is in the idle state.

In one embodiment, the EDCA parameter set of the wake-up frame includes inter-frame space duration; and the processing module is specifically configured to determine, based on the inter-frame space duration, that the channel resource is in the idle state.

The first device according to this embodiment of this application may be corresponding to a first device in a wake-up frame transmission method according to the embodiments of this application, and the foregoing and other operations and/or functions of modules in the first device are separately used to implement corresponding processes of the methods. For brevity, details are not described herein again.

Therefore, the first device in this embodiment of this application determines the EDCA parameter set of the wake-up frame, where the wake-up frame is used to wake up one or more second devices to receive the data frame, determines, based on the EDCA parameter set of the wake-up frame, whether the channel resource is in the idle state, and sends the wake-up frame to the second device when the channel resource is in the idle state. In this way, the first device can perform channel resource contention based on the EDCA parameter set corresponding to the wake-up frame, so that a wake-up frame of a high priority can be served with a high priority, thereby improving QoS performance of the wake-up frame.

Figure 13:
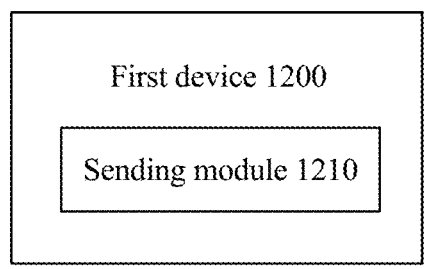
FIG. 13 is a schematic block diagram of a first device according to another embodiment of this application.

FIG. 13 is a schematic block diagram of a first device 1200 according to an embodiment of this application. As shown in FIG. 13, the first device 1200 includes:

a sending module 1210, configured to send indication information to at least one second device, where the indication information indicates a first time at which the first device sends the wake-up frame; where the sending module 1210 is further configured to send the wake-up frame at the first time.

Therefore, the first device in this embodiment of this application sends, to the second device, the indication information used to indicate the first time at which the first device sends the wake-up frame, and then sends the wake-up frame to the second device at the first time. In this way, the first device notifies, in advance, the second device of a time at which the wake-up frame is sent, so that the second device can accurately receive the wake-up frame based on the first time, thereby improving QoS performance of the wake-up frame.

In one embodiment, the indication information includes time information and frame type information, where the time information indicates the first time, and the frame type information indicates that a frame sent by the first device at the first time is the wake-up frame.

In one embodiment, the sending module 1210 is specifically configured to send target wake time (TWT) information to the at least one second device, where the TWT information carries the indication information.

In one embodiment, the frame type information includes at least one bit, and a value of the at least one bit is used to indicate whether the frame sent by the first device at the first time is the wake-up frame.

In one embodiment, the time information includes a duration length and a start time.

In one embodiment, the time information includes a time period, a duration length, and a start time.

Therefore, the first device in this embodiment of this application sends, to the second device, the indication information used to indicate the first time at which the first device sends the wake-up frame, and then sends the wake-up frame to the second device at the first time. In this way, the first device notifies, in advance, the second device of a time at which the wake-up frame is sent, so that the second device can accurately receive the wake-up frame based on the first time, thereby improving QoS performance of the wake-up frame.

The first device according to this embodiment of this application may be corresponding to a first device in a wake-up frame transmission method according to the embodiments of this application, and the foregoing and other operations and/or functions of modules in the first device are separately used to implement corresponding processes of the methods. For brevity, details are not described herein again.

Figure 14:
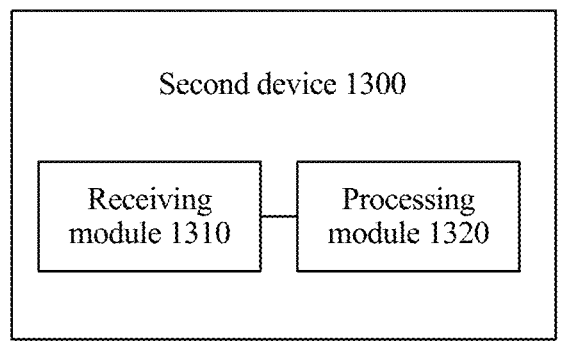
FIG. 14 is a schematic block diagram of a second device according to an embodiment of this application.

FIG. 14 is a schematic block diagram of a second device 1300 according to an embodiment of this application. As shown in FIG. 14, the second device 1300 includes:

a receiving module 1310, configured to receive indication information sent by a first device, where the indication information indicates a first time at which the first device sends the wake-up frame; and a processing module 1320, configured to determine, based on the first time, a second time at which the wake-up frame is received; where the receiving module 1310 is further configured to receive the wake-up frame at the second time.

Therefore, the second device in this embodiment of this application receives the indication information that is sent by the first device and that is used to indicate the first time at which the first device sends the wake-up frame, and determines, based on the indication information, the second time at which the wake-up frame is received; and the second device receives, at the second time, the wake-up frame sent by the first device at the first time. In this way, the second device receives the time at which the wake-up frame is sent and that is notified by the first device in advance, so that the second device can accurately receive the wake-up frame based on the second time that is determined based on the first time, thereby improving QoS performance of the wake-up frame.

In one embodiment, the indication information includes time information and frame type information, where the time information indicates the first time, and the frame type information indicates that a frame sent by the first device at the first time is the wake-up frame.

In one embodiment, the receiving module 1310 is specifically configured to receive target wake time (TWT) information sent by the first device, where the TWT information carries the indication information.

In one embodiment, the frame type information includes at least one bit, a value of the at least one bit is used to indicate whether the frame sent by the first device at the first time is the wake-up frame, and the processing module is further configured to determine, based on the value of the at least one bit, that the first time is a time at which the first device sends the wake-up frame.

In one embodiment, the time information includes a duration length and a start time.

In one embodiment, the time information includes a time period, a duration length, and a start time.

The second device according to this embodiment of this application may be corresponding to a second device in a wake-up frame transmission method according to an embodiment of this application, and the foregoing and other operations and/or functions of modules in the second device are separately used to implement corresponding processes of the methods. For brevity, details are not described herein again.

Therefore, the second device in this embodiment of this application receives the indication information that is sent by the first device and that is used to indicate the first time at which the first device sends the wake-up frame, and determines, based on the indication information, the second time at which the wake-up frame is received; and the second device receives, at the second time, the wake-up frame sent by the first device at the first time. In this way, the second device receives the time at which the wake-up frame is sent and that is notified by the first device in advance, so that the second device can accurately receive the wake-up frame based on the second time that is determined based on the first time, thereby improving QoS performance of the wake-up frame.

Figure 15:
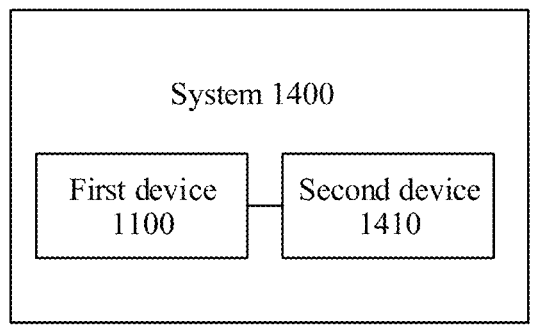
FIG. 15 is a schematic block diagram of a wake-up frame transmission system according to an embodiment of this application.

FIG. 15 shows a wake-up frame transmission system 1400 according to an embodiment of this application. The system 1400 includes:

the first device 1100 in the embodiment shown in FIG. 12 and the second device 1300 in the embodiment shown in FIG. 14.

Figure 16:
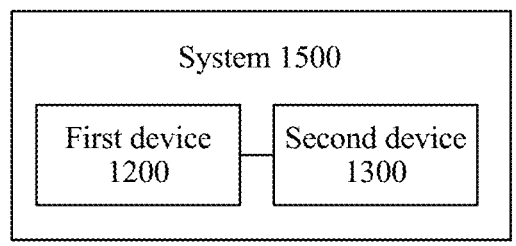
FIG. 16 is a schematic block diagram of a wake-up frame transmission system according to another embodiment of this application.

FIG. 16 shows a wake-up frame transmission system 1500 according to an embodiment of this application. The system 1500 includes:

the first device 1200 in the embodiment shown in FIG. 13 and the second device 1300 in the embodiment shown in FIG. 14.

Figure 17:
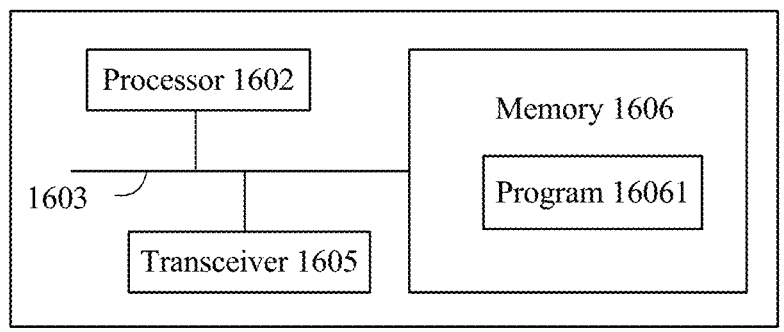
FIG. 17 is a schematic structural diagram of a first device according to an embodiment of this application.

FIG. 17 is a schematic structural diagram of a first device according to an embodiment of this application. As shown in FIG. 17, the first device includes at least one processor 1602

(for example, a general purpose processor CPU with computing and processing capabilities, a digital signal processor (DSP), an application-specific integrated circuit (ASIC), or a field programmable gate array (FPGA)). The processor 1602 is configured to manage and schedule modules and components in the first device. The processing module 1110 in the embodiment shown in FIG. 12 may be implemented by using the processor 1602. The first device further includes at least one transceiver 1605 (a receiver/transmitter 1605), a memory 1606, and at least one bus system 1603. The sending module 1120 in the embodiment shown in FIG. 12 may be implemented by using the transceiver 1605. All components of the first device are coupled together by using the bus system 1603. The bus system 1603 may include a data bus, a power bus, a control bus, and a status signal bus. However, for clarity of description, various buses are marked as the bus system 1603 in the figure.

The method disclosed in the embodiments of this application may be applied to the processor 1602, or is used to execute an executable module stored in the memory 1606, for example, a computer program. The memory 1606 may include a high speed random access memory (Random Access Memory, RAM), or may further include a non-volatile memory (non-volatile memory). The memory may include a read-only memory and a random access memory, and provide required signaling or data, a required program, and the like for the processor. A part of the memory may further include a nonvolatile random access memory (NVRAM). A communication connection to at least one other network element is implemented by using at least one transceiver 1605 (which may be wired or wireless).

In some implementations, the memory 1606 stores a program 16061, and the processor 1602 executes the program 16061 to perform the following operations:

determining an EDCA parameter set of a wake-up frame, where the wake-up frame is used to wake up one or more second devices to receive a data frame;

determining, based on the EDCA parameter set of the wake-up frame, whether a channel resource is in an idle state; and sending the wake-up frame to the second device by using the transceiver 1605 when the channel resource is in the idle state.

It should be noted that the first device may be specifically the first device in the embodiment shown in FIG. 7, and may be configured to perform steps and/or procedures corresponding to the first device in the method embodiment shown in FIG. 7.

According to the foregoing technical solution provided in this embodiment of this application, the first device determines the EDCA parameter set of the wake-up frame, where the wake-up frame is used to wake up one or more second devices to receive the data frame, determines, based on the EDCA parameter set of the wake-up frame, whether the channel resource is in the idle state, and sends the wake-up frame to the second device when the channel resource is in the idle state. In this way, the first device can perform channel resource contention based on the EDCA parameter set corresponding to the wake-up frame, so that a wake-up frame of a high priority can be served with a high priority, thereby improving QoS performance of the wake-up frame.

Figure 18:
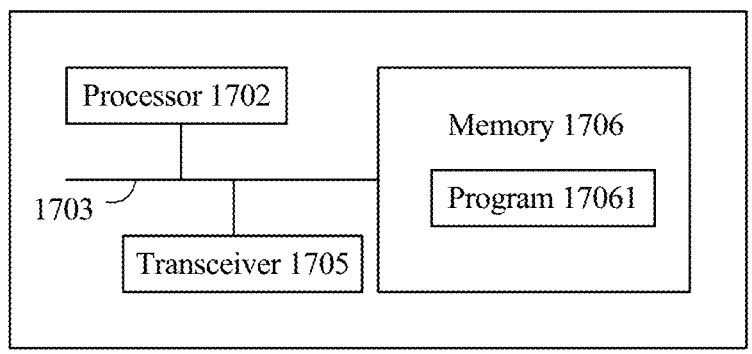
FIG. 18 is a schematic structural diagram of a first device according to another embodiment of this application.

FIG. 18 is a schematic structural diagram of a first device according to an embodiment of this application. As shown in FIG. 18, the first device includes at least one transceiver 1705 (a receiver/transmitter 1705). The sending module 1210 in the embodiment shown in FIG. 13 may be implemented by using the transceiver 1705. The first device further includes at least one processor 1702 (for example, a general purpose processor CPU with computing and processing capabilities, a digital signal processor (DSP), an application-specific integrated circuit (ASIC), or a field programmable gate array (FPGA)), a memory 1706, and at least one bus system 1703. The processor 1702 is configured to manage and schedule modules and components in the first device. All components of the first device are coupled together by using the bus system 1703. The bus system 1703 may include a data bus, a power bus, a control bus, and a status signal bus. However, for clarity of description, various buses are marked as the bus system 1703 in the figure.

The method disclosed in the embodiment of this application may be applied to the processor 1702, or is used to execute an executable module stored in the memory 1706, for example, a computer program. The memory 1706 may include a high speed random access memory (Random Access Memory, RAM), or may further include a non-volatile memory (non-volatile memory). The memory may include a read-only memory and a random access memory, and provide required signaling or data, a required program, and the like for the processor. A part of the memory may further include a nonvolatile random access memory (NVRAM). A communication connection to at least one other network element is implemented by using at least one transceiver 1705 (which may be wired or wireless).

In some implementations, the memory 1706 stores a program 17061, and the processor 1702 executes the program 17061 to perform the following operations:

receiving indication information sent by a first device by using the transceiver 1705, where the indication information indicates a first time at which the first device sends the wake-up frame; and sending the wake-up frame at the first time by using the transceiver 1705.

It should be noted that the first device may be specifically the first device in the embodiment shown in FIG. 8, and may be configured to perform steps and/or procedures corresponding to the first device in the method embodiment shown in FIG. 8.

According to the foregoing technical solution provided in this embodiment of this application, the first device sends, to the second device, the indication information used to indicate the first time at which the first device sends the wake-up frame, and then sends the wake-up frame to the second device at the first time. In this way, the first device notifies, in advance, the second device of a time at which the wake-up frame is sent, so that the second device can accurately receive the wake-up frame based on the first time, thereby improving QoS performance of the wake-up frame.

Figure 19:
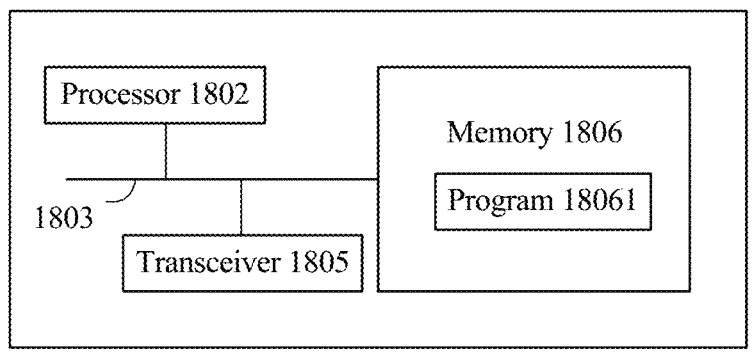
FIG. 19 is a schematic structural diagram of a second device according to another embodiment of this application.

FIG. 19 is a schematic structural diagram of a second device according to an embodiment of this application. As shown in FIG. 19, the second device includes at least one processor 1802 (for example, a general purpose processor CPU with computing and processing capabilities, a digital signal processor (DSP), an application-specific integrated circuit (ASIC), or a field programmable gate array (FPGA)). The processor 1802 is configured to manage and schedule modules and components in the second device. The processing module 1320 in the embodiment shown in FIG. 14 may be implemented by using the processor 1802. The second device further includes at least one transceiver 1805 (a receiver/transmitter 1805), a memory 1806, and at least one bus system 1803. The receiving module 1310 in the embodiment shown in FIG. 14 may be implemented by using the transceiver 1805. All components of the second device are coupled together by using the bus system 1803.

The bus system 1803 may include a data bus, a power bus, a control bus, and a status signal bus. However, for clarity of description, various buses are marked as the bus system 1803 in the figure.

The method disclosed in the embodiment of this application may be applied to the processor 1802, or is used to execute an executable module stored in the memory 1806, for example, a computer program. The memory 1806 may include a high speed random access memory (Random Access Memory, RAM), or may further include a non-volatile memory (non-volatile memory). The memory may include a read-only memory and a random access memory, and provide required signaling or data, a required program, and the like for the processor. A part of the memory may further include a nonvolatile random access memory (NVRAM). A communication connection to at least one other network element is implemented by using at least one transceiver 1805 (which may be wired or wireless).

In some implementations, the memory 1806 stores a program 18061, and the processor 1802 executes the program 18061 to perform the following operations:

receiving indication information sent by a first device by using the transceiver 1805, where the indication information indicates a first time at which the first device sends the wake-up frame;

determining, based on the first time received by the receiving module, a second time at which the wake-up frame is received; and receiving the wake-up frame at the second time by using the transceiver 1805.

It should be noted that the second device may be specifically the second device in the embodiment shown in FIG. 8, and may be configured to perform steps and/or procedures corresponding to the second device in the method embodiment shown in FIG. 8.

According to the foregoing technical solution provided in this embodiment of this application, the second device receives the indication information that is sent by the first device and that is used to indicate the first time at which the first device sends the wake-up frame, and determines, based on the indication information, the second time at which the wake-up frame is received; and the second device receives, at the second time, the wake-up frame sent by the first device at the first time. In this way, the second device receives the time at which the wake-up frame is sent and that is notified by the first device in advance, so that the second device can accurately receive the wake-up frame based on the second time that is determined based on the first time, thereby improving QoS performance of the wake-up frame.

An embodiment of this application further provides a computer storage medium, and the computer storage medium may store a program instruction for executing any of the foregoing methods.

In one embodiment, the storage medium may be specifically the memory 1606, 1706, or 1806.

It should be understood that specific examples in this application are merely intended to help a person skilled in the art better understand the embodiments of this application, but not to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely used as an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wake-up frame transmission method, comprising:
   determining, by a first device, an enhanced distributed channel access (EDCA) parameter set of a wake-up frame, wherein the wake-up frame is used to wake up one or more second devices to receive a data frame, the data frame has a channel access category, the channel access category of the data frame is one channel access category of a plurality channel access categories, and each channel access category of the plurality of channel access categories has a corresponding EDCA parameter set comprising a different combination of values for a contention window duration and an inter-frame space duration;
   determining, by the first device based on at least the inter-frame space duration included in the EDCA parameter set of the wake-up frame, whether a channel resource is in an idle state in the inter-frame space duration; and
   sending, by the first device, the wake-up frame to at least one of the second devices when the channel resource is in the idle state in the inter-frame space duration.

2. The method according to claim 1, further comprising:
   determining, by the first device, the channel access category of the data frame; and
   determining, by the first device, the EDCA parameter set of the wake-up frame based on the determined channel access category of the data frame.

3. The method according to claim 2, wherein the channel access category of the data frame is a highest channel access category in the plurality of channel access categories.

4. The method according to claim 1, wherein
   the EDCA parameter set of the wake-up frame corresponds to a highest channel access category of a system.

5. The method according to claim 1, further comprising:
   determining, by the first device, a backoff duration based on the contention window duration; and
   determining, by the first device based on the inter-frame space duration and the backoff duration, whether the channel resource is in the idle state; and
   resending, by the first device, the wake-up frame to the at least one second device after the backoff duration based on a determination the channel resource is in the idle state based on the inter-frame space duration and the backoff duration.

6. The method according to claim 1, wherein the wake-up frame is immediately sent to the at least one second device by the first device based on a determination the channel resource is in the idle state in the inter-frame space duration.

7. A first device, comprising:
   a memory configured to store instructions; and
   a processor configured to execute the instructions stored in the memory to:
      determine an enhanced distributed channel access (EDCA) parameter set of a wake-up frame, wherein the wake-up frame is used to wake up one or more second devices to receive a data frame, the data frame has a channel access category, the channel access category of the data frame is one channel access category of a plurality channel access categories, and each channel access category of the plurality of channel access categories has a corresponding EDCA parameter set comprising a different combination of values for a contention window duration and an inter-frame space duration;
      determine, based on at least the inter-frame space duration included in the EDCA parameter set of the wake-up frame, whether a channel resource is in an idle state in the inter-frame space duration; and
      send the wake-up frame to at least one of the second devices when the channel resource is in the idle state in the inter-frame space duration.

8. The first device according to claim 7, wherein the processor is further configured to execute the instructions to:
   determine the channel access category of the data frame; and
   determine the EDCA parameter set of the wake-up frame based on the determined channel access category of the data frame.

9. The first device according to claim 8, wherein the channel access category of the data frame is a highest channel access category in the plurality of channel access categories.

10. The first device according to claim 7, wherein the EDCA parameter set of the wake-up frame corresponds to a highest channel access category of a system.

11. The first device according to claim 7, wherein the processor is further configured to execute the instructions to:
    determine a backoff duration based on the contention window duration;
    determine, based on the backoff duration and the inter-frame space duration, whether the channel resource is in the idle state; and
    resend the wake-up frame to the at least one second device after the backoff duration based on a determination the channel resource is in the idle state based on the inter-frame space duration and the backoff duration.

12. The first device according to claim 7, wherein the wake-up frame is immediately sent to the at least one second device based on a determination the channel resource is in the idle state in the inter-frame space duration.

13. A non-transitory computer-readable storage medium, wherein the medium is configured to store instructions for execution by a processor of a first device to perform a wake-up transmission method comprising:
    determining an enhanced distributed channel access (EDCA) parameter set of a wake-up frame, wherein the wake-up frame is used to wake up one or more second devices to receive a data frame, the data frame has a channel access category, the channel access category of the data frame is one channel access category of a plurality channel access categories, and each channel access category of the plurality of channel access categories has a corresponding EDCA parameter set comprising a different combination of values for a contention window duration and an inter-frame space duration;
    determining based on at least the inter-frame space duration included in the EDCA parameter set of the wake-up frame, whether a channel resource is in an idle state in the inter-frame space duration; and sending the wake-up frame to at least one of the second devices when the channel resource is in the idle state in the inter-frame space duration.

14. The non-transitory computer-readable storage medium according to claim 13, wherein the wake-up transmission method performed by the processor further comprises:

determining the channel access category of the data frame; and determining the EDCA parameter set of the wake-up frame based on the determined channel access category of the data frame.

15. The non-transitory computer-readable storage medium according to claim 14, wherein the channel access category of the data frame is a highest channel access category in the plurality of channel access categories.

16. The non-transitory computer-readable storage medium according to claim 13, wherein the EDCA parameter set of the wake-up frame corresponds to a highest channel access category of a system.

17. The non-transitory computer-readable storage medium according to claim 13, wherein the wake-up transmission method performed by the processor further comprises:

determining a backoff duration based on the contention window duration;

determining based on the inter-frame space duration and the backoff duration, whether the channel resource is in the idle state; and resending the wake-up frame to the at least one second device after the backoff duration based on a determination the channel resource is in the idle state based on the inter-frame space duration and the backoff duration.

18. The non-transitory computer-readable storage medium according to claim 13, wherein the wake-up frame is immediately sent to the at least one second device by the first device based on a determination the channel resource is in the idle state in the inter-frame space duration.

\* \* \* \* \*

UNITED STATES PATENT AND TRADEMARK OFFICE
CERTIFICATE OF CORRECTION

PATENT NO. : 10,917,848 B2  
APPLICATION NO. : 16/382154  
DATED : February 9, 2021  
INVENTOR(S) : Yuchen Guo Page 1 of 1

It is certified that error appears in the above-identified patent and that said Letters Patent is hereby corrected as shown below:

In the Specification

Column 12, Lines 63-67 should be replaced with:
"For example, as shown in Table 1, if the channel access categories that are of the plurality of data frames and that are for the plurality of second devices include three types: AC_VI, AC_BK, and AC_BE, the first device determines a parameter set corresponding to the AC_VI (that is, a highest channel access category in these three types of channel access categories) as the EDCA parameter set of the WB."

Column 13, Lines 1-6 should be replaced with:
"In one embodiment, that the first device determines the EDCA parameter set of the wake-up frame includes that: The first device determines the EDCA parameter set corresponding to the highest channel access category of a system as the EDCA parameter set of the wake-up frame."

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*